(12) United States Patent
Zeng et al.

(10) Patent No.: US 10,247,986 B2
(45) Date of Patent: Apr. 2, 2019

(54) BACKLIGHT MODULE

(71) Applicant: Wuhan China Star Optoelectronics Technology Co., Ltd., Wuhan, Hubei (CN)

(72) Inventors: Jie Zeng, Hubei (CN); Xiaoling Li, Hubei (CN)

(73) Assignee: Wuhan China Star Optoelectronics Technology Co., Ltd, Wuhan (CN)

( * ) Notice: Subject to any disclaimer, the term of this patent is extended or adjusted under 35 U.S.C. 154(b) by 164 days.

(21) Appl. No.: 15/327,464

(22) PCT Filed: Dec. 27, 2016

(86) PCT No.: PCT/CN2016/112334
§ 371 (c)(1),
(2) Date: Jan. 19, 2017

(87) PCT Pub. No.: WO2018/113000
PCT Pub. Date: Jun. 28, 2018

(65) Prior Publication Data
US 2018/0210290 A1 Jul. 26, 2018

(30) Foreign Application Priority Data
Dec. 20, 2016 (CN) .......................... 2016 1 1183230

(51) Int. Cl.
*G02F 1/1335* (2006.01)
*G02F 1/1333* (2006.01)
*F21V 8/00* (2006.01)

(52) U.S. Cl.
CPC ..... *G02F 1/133608* (2013.01); *G02B 6/0055* (2013.01); *G02B 6/0088* (2013.01); *G02F 1/133308* (2013.01); *G02F 1/133605* (2013.01); *G02F 1/133606* (2013.01); *G02F 2001/133314* (2013.01); *G02F 2001/133317* (2013.01)

(58) Field of Classification Search
None
See application file for complete search history.

(56) References Cited

U.S. PATENT DOCUMENTS

2011/0069251 A1* 3/2011 Hung ................ G02F 1/133308
349/62
2014/0029297 A1* 1/2014 Watabe ................ G02B 6/0016
362/608

* cited by examiner

Primary Examiner — Elmito Breval

(57) ABSTRACT

Disclosed is a backlight module. The backlight module includes a backplane. The backplane is provided with a groove therethrough. Two sides and/or two ends of an optical diaphragm of the backlight module each are connected with a bendable flap which passes through the groove and is attached to the backplane. The backlight module has a simple structure without a plastic frame or a frame sealant, and an optical diaphragm in the backlight module can be fixed. A super narrow frame of the backlight module can be realized.

12 Claims, 4 Drawing Sheets

BACKLIGHT MODULE

CROSS-REFERENCE TO RELATED APPLICATIONS

This application claims the priority of Chinese patent application CN201611183230.1, entitled "Backlight module" and filed on Dec. 20, 2016, the entirety of which is incorporated herein by reference.

FIELD OF THE INVENTION

The present disclosure relates to the technical field of liquid crystal display device, and in particular, to a backlight module.

BACKGROUND OF THE INVENTION

At present, liquid crystal display devices are widely used as display components in variety kinds of electronic products, and a backlight module is an important component in a liquid crystal display device.

In general, as shown in FIG. 1, a small and medium sized backlight module (different from the large sized ones) comprises a plastic frame 1, a reflective sheet 2, a light guide plate 3, an optical diaphragm 4, a light source flexible printed circuit 5 (LB FPC), an LED 6, a display screen 8 (cell) and a light-shielding tape 9. The light source flexible printed circuit 5 and the LED 6 are fixed to the light guide plate 3 and the plastic frame 1 by the light-shielding tape 9. With development of narrow frame display devices, a method that the plastic frame is replaced by an iron frame is proposed. Based on technical level at present, a thickness of the iron frame can reach as small as 0.1 mm, and therefore, a frame width of a display device can be greatly reduced compared with the case that when the plastic frame (with a thickness of 0.4 to 0.5 mm) is used. Besides, in order to further reduce the frame width, a method of removing frame sealant (light shielding sealant) is used. However, this design without plastic frame or light shielding sealant leads to the result that the optical diaphragm cannot be fixed.

In order to solve the above problem, it is necessary to provide a new backlight module.

SUMMARY OF THE INVENTION

According to the present disclosure, a backlight module has a simple structure, and the problem that an optical diaphragm cannot be fixed when plastic frame or frame sealant is not arranged therein can be solved. That is, the optical diaphragm can be fixed when plastic frame or frame sealant is not arranged, and the purpose of designing a super narrow frame can be achieved.

In order to achieve the above effects, the present disclosure provides a backlight module. The backlight module comprises a backplane. The backplane is provided with a groove therethrough. Two sides and/or two ends of an optical diaphragm of the backlight module each are connected with a bendable flap which passes through the groove and is attached to the backplane.

In the aforementioned backlight module, the backplane further comprises a base plate, first lateral plates arranged on two ends of the base plate and second lateral plates arranged on two sides of the base plate.

In the aforementioned backlight module, the backlight module further comprises a reflective sheet arranged on the base plate and a light guide plate arranged between the reflective sheet and the optical diaphragm.

In the aforementioned backlight module, the two ends of the base plate each are provided with the groove, and the two ends of the optical diaphragm each are connected with the bendable flap. The bendable flap is bent and passes through the groove, and an end of the bendable flap is attached to a bottom of the base plate.

In the aforementioned backlight module, two first lateral plates each are provided with a groove; a groove in one of the two first lateral plates is arranged corresponding to a groove in the other one of the two first lateral plates; and the two ends of the optical diaphragm each are connected with the bendable flap which passes through the groove and is attached to a corresponding first lateral plate.

In the aforementioned backlight module, the groove is formed in at least one of the second lateral plates, and at least one side of the optical diaphragm is connected with the bendable flap. The bendable flap on one side of the optical diaphragm passes through the through the groove in the second lateral plate and is attached to the second lateral plate.

In the aforementioned backlight module, the optical diaphragm comprises an upper prism, a lower prism and a diffusion sheet from top to bottom in sequence, and the bendable flap is connected with two sides and/or two ends of the upper prism.

In the aforementioned backlight module, a thickness of the bendable flap is less than a width of the groove.

In the aforementioned backlight module, a display screen is arranged on the optical diaphragm.

In the aforementioned backlight module, the first lateral plates each are provided with a plurality of grooves which are arranged spaced from one another, and the two ends of the optical diaphragm each are provided with a plurality of bendable flaps which are arranged spaced from one another. Each bendable flap passes through a corresponding groove and is attached to a corresponding first lateral plate.

Compared with a backlight module in the prior art, the backlight module in the present disclosure has a simple structure, whereby the optical diaphragm can be fixed when plastic frame or frame sealant is not arranged therein, and the effect of super narrow frame of the backlight module can be achieved.

The technical features described hereinabove may be combined in various suitable manners or replaced with equivalent technical features, as long as the purpose of the present disclosure can be achieved.

BRIEF DESCRIPTION OF THE DRAWINGS

The accompanying drawings described herein are for illustration purposes only and are not intended to limit the scope of the present disclosure in any way. In addition, the shape, proportion and dimension of each component in the drawings are merely schematic and used to help the understanding of the present disclosure, but not to define the shape, proportion and dimension of each component of the present disclosure specifically. With the teachings of the present disclosure, those skilled in the art may implement the present disclosure by selecting various possible shapes, proportions and dimensions according to actual situations.

In the accompanying drawings, same components use same reference signs. The accompanying drawings are not drawn according to actual proportions.

DETAILED DESCRIPTION OF THE EMBODIMENTS

The details of the present disclosure can be understood more clearly combining the description on the drawings and the embodiments. However, the specific embodiments disclosed herein are only used for illustrating the present disclosure, while cannot be understood as limiting the present disclosure in any manner. Those skilled in the art can make any deformations under the teaching of the technical content disclosed herein, and all the deformations fall into the scope of the present disclosure. The present disclosure will be further illustrated hereinafter with reference to the drawings.

Figure 1:
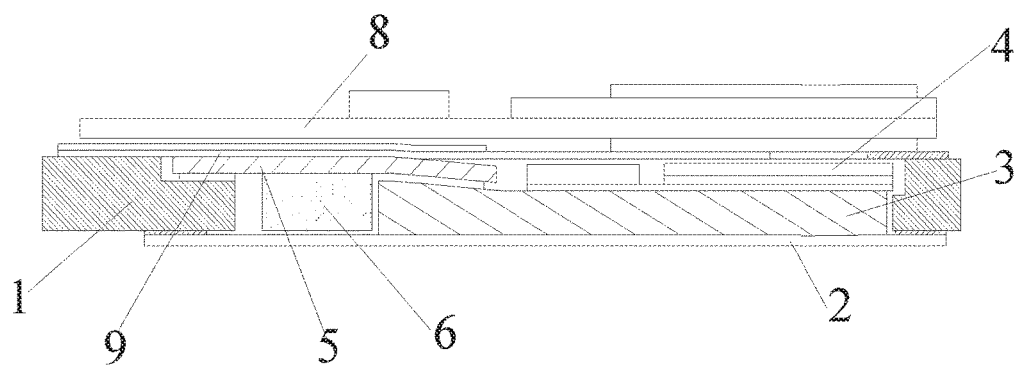
FIG. 1 schematically shows a structure of a backlight module in the prior art.
Figure 2:
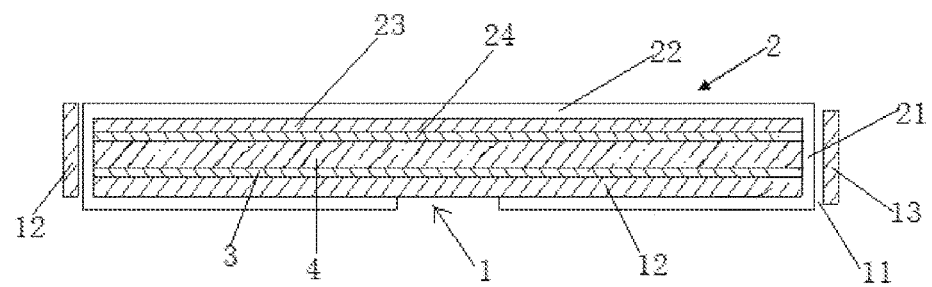
FIG. 2 schematically shows a structure of a backlight module according to the present disclosure.
Figure 3:
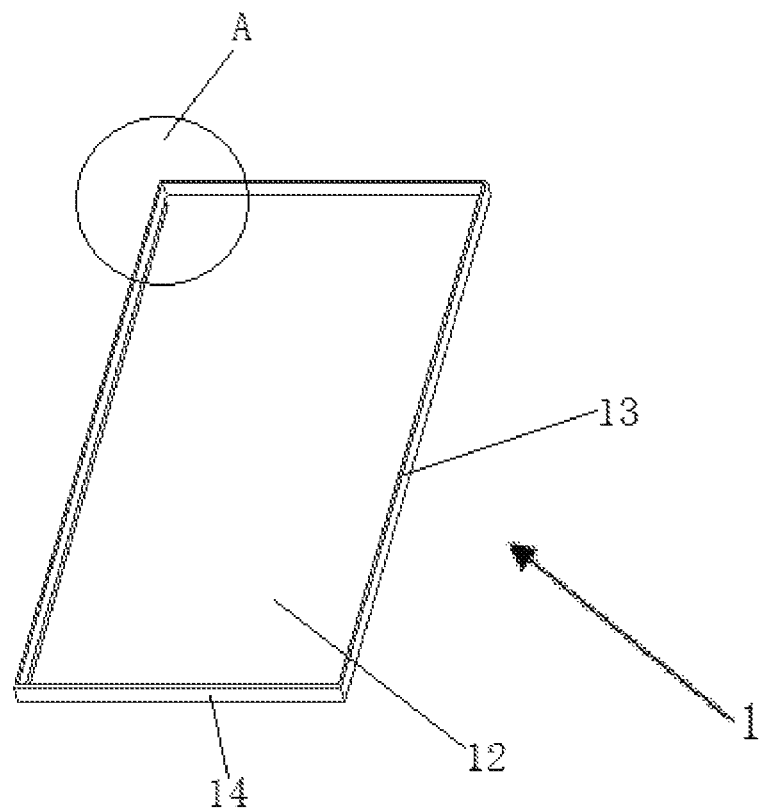
FIG. 3 schematically shows a structure of a base plate according to the present disclosure.
Figure 4:
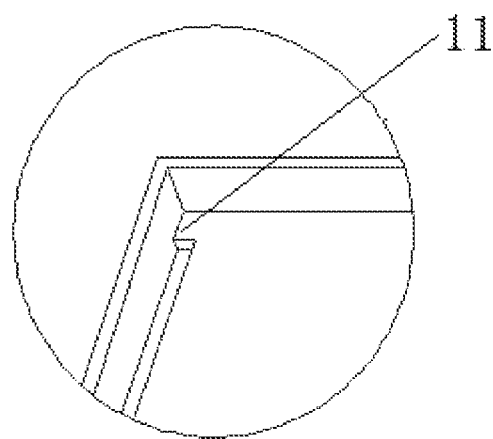
FIG. 4 schematically shows an enlarged view of part A in FIG. 3.

FIGS. 2 to 4 schematically show a structure of a backlight module, a structure of a base plate, and an enlarged view of part A in FIG. 3 according to the present disclosure respectively. FIGS. 5 to 8 show front views (1) to (4) of an optical diaphragm connected with a bendable flap according to the present disclosure.

As shown in FIG. 2, the backlight module comprises a backplane 1. The backplane 1 is provided with a groove 11 therethrough. Two sides and/or two ends of an optical diaphragm 2 of the backlight module each are connected with a bendable flap 21 which can pass through the groove 11. The bendable flap 21 passes through the groove 11 and is attached to the backplane 1.

Specifically, according to the present disclosure, as shown in FIG. 3, the backplane 1 comprises a base plate 12, first lateral plates 13 arranged on two ends of the base plate 12, and second lateral plates 14 arranged on two sides of the base plate 12.

According to the present disclosure, the backlight module further comprises a reflective sheet 3 and a light guide plate 4. The reflective sheet 3 is arranged on the base plate 12, and the light guide plate 4 is arranged between the reflective sheet 3 and the optical diaphragm 2.

Specifically, the optical diaphragm 2 comprises an upper prism 22, a lower prism 23 and a diffusion sheet 24 from top to bottom in sequence, and the bendable flap 21 is connected with two sides and/or two ends of the upper prism 22.

According to one specific embodiment, as shown in FIG. 2, grooves 11 are formed on the two ends of the base plate 12, and two ends of the upper prism 22 are connected with bendable flaps 21. The bendable flaps 21 are bent and pass through the grooves 11, and ends of the bendable flaps 21 are bent again and attached to a bottom of the base plate 12. In this manner, the uppermost optical diaphragm 2 passes through the grooves 11 of the backplane 1, is bent and attached to a bottom of the backplane 1 so as to be fixed. That is, the upper prism 22 passes through the grooves 11 of the backplane 1, is bent and attached to a bottom of the backplane 1 so as to be fixed. Therefore, the lower prism 23, the diffusion sheet 24, the light guide plate 4 and the reflective sheet 3 are fixed within a gap between the upper prism 22 and the backplane 1, and thus a backlight module in which the optical diaphragm 2 can be fixed when a plastic frame or a frame sealant is not arranged therein is provided.

Figure 5:
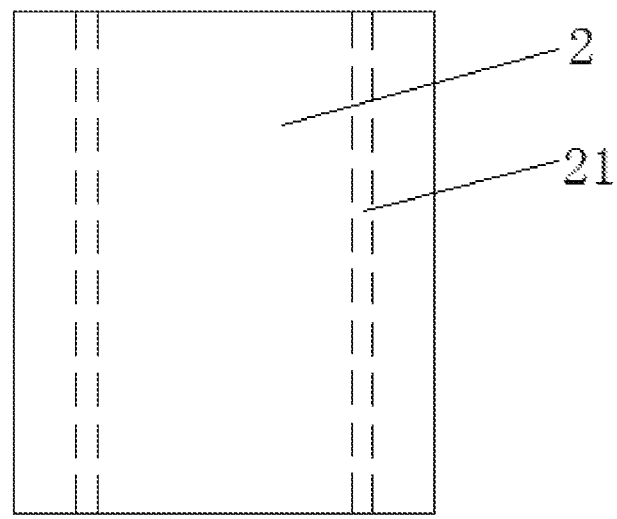
FIG. 5 shows a front view (1) of an optical diaphragm connected with a bendable flap according to the present disclosure.
Figure 6:
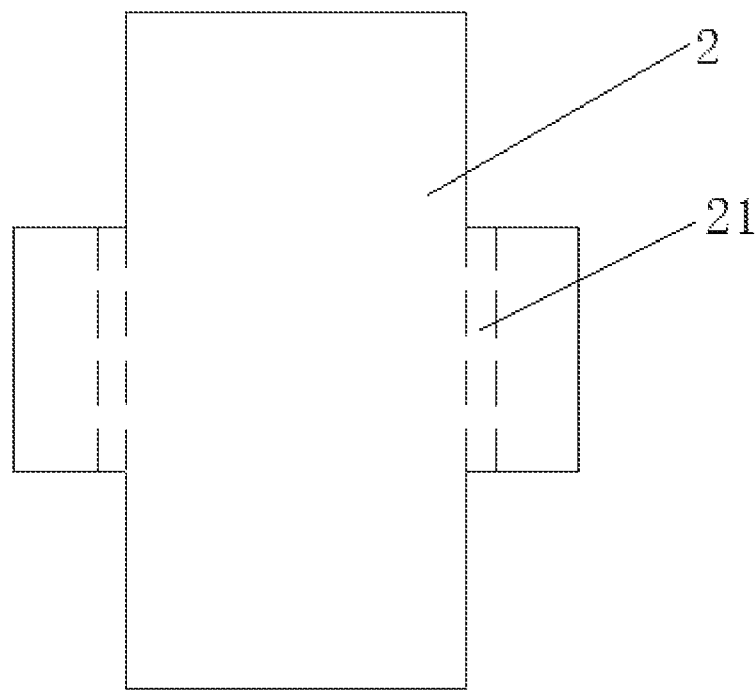
FIG. 6 shows a front view (2) of an optical diaphragm connected with a bendable flap according to the present disclosure.
Figure 7:
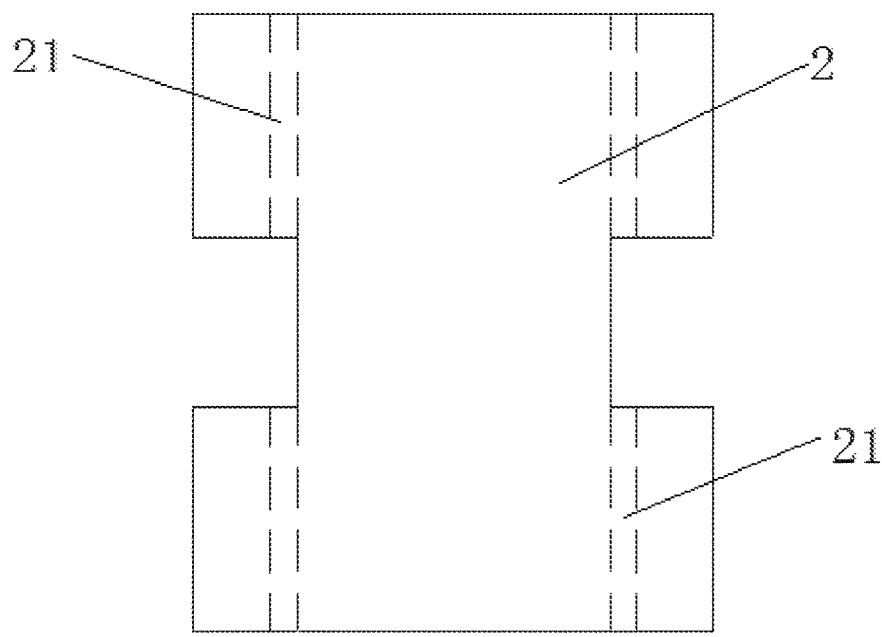
FIG. 7 shows a front view (3) of an optical diaphragm connected with a bendable flap according to the present disclosure.

According to another embodiment, the first lateral plates 13 and/or the second lateral plates 14 on the two sides or two edges of the backplane 1 each are provided with one bendable flap 21 or a plurality of bendable flaps 21 thereon. As shown in FIGS. 5 and 6, the bendable flap 21 is arranged on an entire region on the two sides of the optical diaphragm 2, or on a middle region of the optical diaphragm 2. As shown in FIG. 7, two bendable flaps 21 which are spaced from each other are provided on the two sides of the optical diaphragm 2. According to the present disclosure, the bendable flaps 21 correspond to the grooves 11 of the backplane 1 one to one. The bendable flaps 21 pass through the corresponding grooves and then are bent, so as to be attached to the backplane 1.

According to one specific embodiment, two first lateral plates 13 are provided with the grooves 11 in the middle regions thereof, and one groove 11 in one of the two first lateral plates 13 is arranged corresponding to one groove 11 in the other one of the two first lateral plates 13. Two ends of the optical diaphragm 2 are connected with the bendable flaps 21. The bendable flaps 21, after pass through the grooves 11, are bent and attached to the first lateral plates 13, so that the upper prism 22 passes through the grooves 11 of the backplane 1, is bent and attached to a lateral surface of the backplane 1 so as to be fixed. In this manner, the lower prism 23, the diffusion sheet 24, the light guide plate 4 and the reflective sheet 3 are fixed within a gap between the upper prism 22 and the backplane 1, and thus a backlight module in which the optical diaphragm 2 can be fixed when the plastic frame or the frame sealant is not arranged therein is provided.

Figure 8:
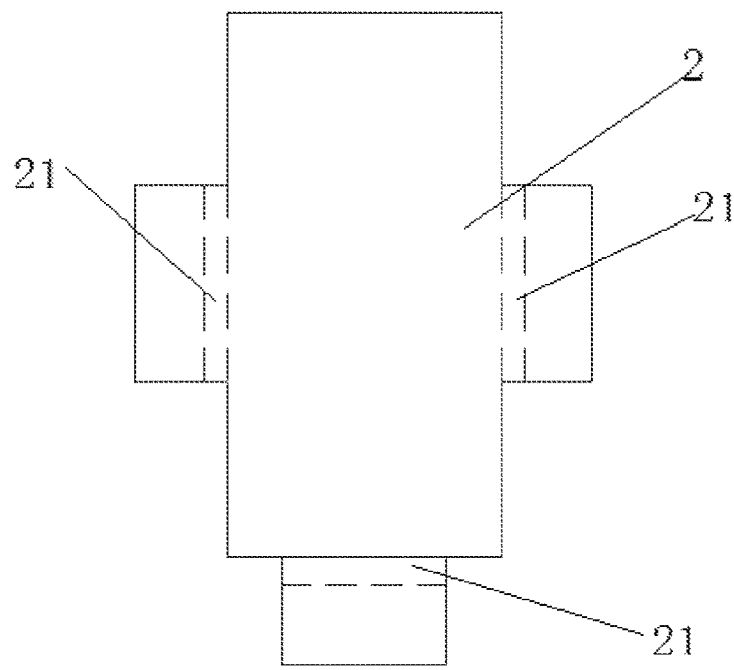
FIG. 8 shows a front view (4) of an optical diaphragm connected with a bendable flap according to the present disclosure.

Further, at least one of the second lateral plates 14 is provided with the groove 11 therethrough. As shown in FIG. 8, at least one side of the optical diaphragm 2 is connected with the bendable flap 21. The bendable flap 21 on one side of the optical diaphragm 2 passes through the groove 11 in the second lateral plate 14 and is attached thereto so as to further increase a stability of a connection between the upper prism 22 and the backplane 1. That is, according to the present disclosure, the two or three lateral plates of the backplane 1 are provided with the grooves 11, and the bendable flaps 21 are arranged corresponding to the grooves 11.

In FIGS. 5 to 8, dotted lines represent lines along which bendable flaps 21 are bent.

Of course, when two bendable flaps 21 which are spaced from each other are provided on the two sides of the optical diaphragm 2, two grooves which are spaced from each other are provided on two first lateral plates 13. That is, two bendable flaps which are spaced from each other pass through corresponding grooves and are attached to the first lateral plates 13.

According to the present disclosure, a thickness of the bendable flap 21 is less than a width of the groove 11. That is, a width of the groove 11 is slightly larger than a thickness of the upper prism 22. The upper prism 22 passes through the grooves 11 in the backplane 1, is bent and attached to a bottom or a lateral surface of the backplane 1 so as to be fixed. In this manner, the lower prism 23, the diffusion sheet 24, the light guide plate 4 and the reflective sheet 3 are in a gap between the upper prism 22 and the backplane 1.

Further, a display screen is arranged on the optical diaphragm 2. According to the present disclosure, as shown in FIG. 3, a light source flexible printed circuit and an LEI) can be arranged in a gap between the first lateral plates 13 and the bendable flap 21, and the light source flexible printed circuit is fixed on the first lateral plates 13.

The backlight module of the present disclosure has a simple structure without a plastic frame or a frame sealant, and the effect of the backlight module with a super narrow frame and the fixing of the optical diaphragm can be achieved. According to the present disclosure, the uppermost optical diaphragm 2 passes through the groove 11 in the backplane 1, is bent and attached to the bottom or a lateral surface of the backplane 1 so as to be fixed. That is, the upper prism 22 passes through the groove 11 in the backplane 1, is bent and attached to the bottom or the lateral surface of the backplane 1 so as to be fixed. In this manner, the lower prism 23, the diffusion sheet 24, the light guide plate 4 and the reflective sheet 3 are fixed within a gap between the upper prism 22 and the backplane 1. A backlight module without the plastic frame or the frame sealant is provided, and the optical diaphragm 2 therein can be fixed.

The technical solution described hereinabove is only one embodiment of the present disclosure. For those skilled in the art, based on the application method and principle disclosed in the present disclosure, it is easy to make various types of improvements or deformations, but not to be limited to the methods described by the above specific embodiments of the present disclosure. The present disclosure is explained in combination with preferred embodiments hereinabove, but the embodiments disclosed herein can be improved or the components thereof can be substituted with their equivalents without departing from the protection scope of the present disclosure. In particular, as long as there are no structural conflicts, the technical features disclosed in each and every embodiment can be combined with one another in any way. The present disclosure is not limited by the specific embodiments disclosed herein, but includes all technical solutions falling into the protection scope of the claims.

The invention claimed is:

1. A backlight module, comprising a backplane, wherein the backplane is provided with a groove therethrough; and
   wherein two sides and/or two ends of an optical diaphragm of the backlight module each are connected with a bendable flap which passes through the groove and is attached to the backplane; and
   the backplane comprises a base plate, first lateral plates arranged on two ends of the base plate, and second lateral plates arranged on two sides of the base plate; and
   the first lateral plates each are provided with a plurality of grooves which are arranged spaced from one another, and the two ends of the optical diaphragm each are provided with a plurality of bendable flaps which are arranged spaced from one another; and
   wherein each bendable flap passes through a corresponding groove and is attached to a corresponding first lateral plate.

2. The backlight module according to claim 1, further comprising:
   a reflective sheet, arranged on the base plate; and
   a light guide plate, arranged between the reflective sheet and the optical diaphragm.

3. The backlight module according to claim 2, wherein the two ends of the base plate each are provided with the groove, and the two ends of the optical diaphragm each are connected with the bendable flap; and
   wherein the bendable flap is bent and passes through the groove, and an end of the bendable flap is attached to a bottom of the base plate.

4. The backlight module according to claim 3, wherein two first lateral plates each are provided with a groove;
   wherein a groove in one of the two first lateral plates is arranged corresponding to a groove in the other one of the two first lateral plates; and
   wherein the two ends of the optical diaphragm each are connected with the bendable flap which passes through the groove and is attached to a corresponding first lateral plate.

5. The backlight module according to claim 4, wherein the optical diaphragm comprises an upper prism, a lower prism and a diffusion sheet from top to bottom in sequence, and the bendable flap is connected with two sides and/or two ends of the upper prism.

6. The backlight module according to claim 4, wherein a thickness of the bendable flap is less than a width of the groove.

7. The backlight module according to claim 6, wherein a display screen is arranged on the optical diaphragm.

8. The backlight module according to claim 2, wherein two first lateral plates each are provided with a groove;
   wherein a groove in one of the two first lateral plates is arranged corresponding to a groove in the other one of the two first lateral plates; and
   wherein the two ends of the optical diaphragm each are connected with the bendable flap which passes through the groove and is attached to a corresponding first lateral plate.

9. The backlight module according to claim 8, wherein the groove is formed in at least one of the second lateral plates, and at least one side of the optical diaphragm is connected with the bendable flap; and
   wherein the bendable flap on one side of the optical diaphragm passes through the groove in the second lateral plate and is attached to the second lateral plate.

10. The backlight module according to claim 1, wherein the optical diaphragm comprises an upper prism, a lower prism and a diffusion sheet from top to bottom in sequence, and the bendable flap is connected with two sides and/or two ends of the upper prism.

11. The backlight module according to claim 1, wherein a thickness of the bendable flap is less than a width of the groove.

12. The backlight module according to claim 1, wherein a display screen is arranged on the optical diaphragm.

* * * * *